Feb. 11, 1936.   R. K. JEFFREY   2,030,636
DRILL MECHANISM
Filed Sept. 24, 1930   3 Sheets-Sheet 3

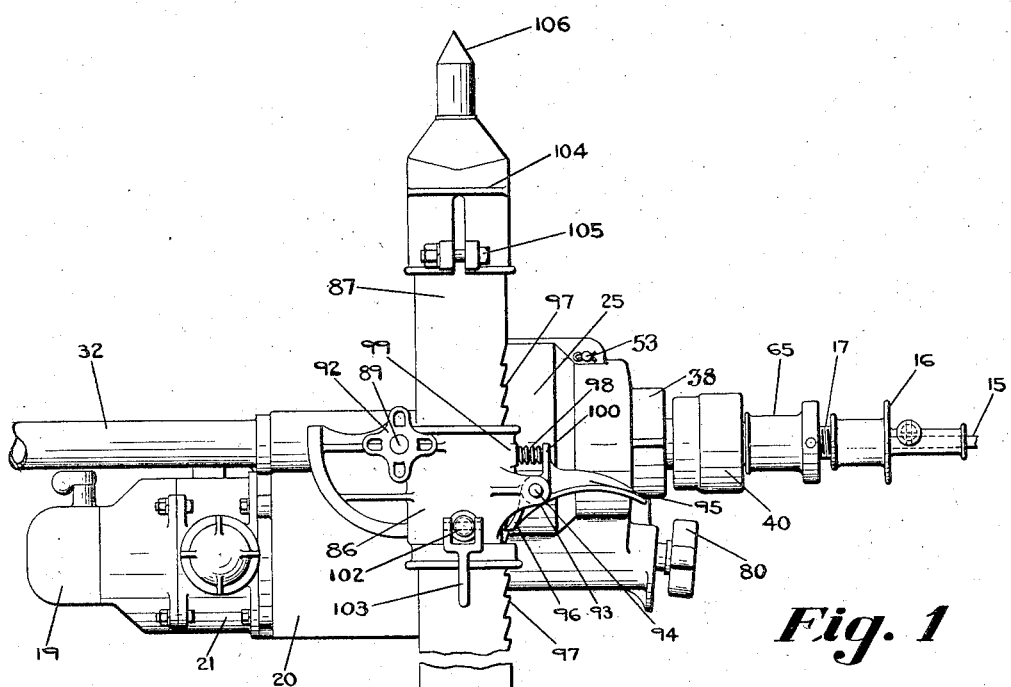

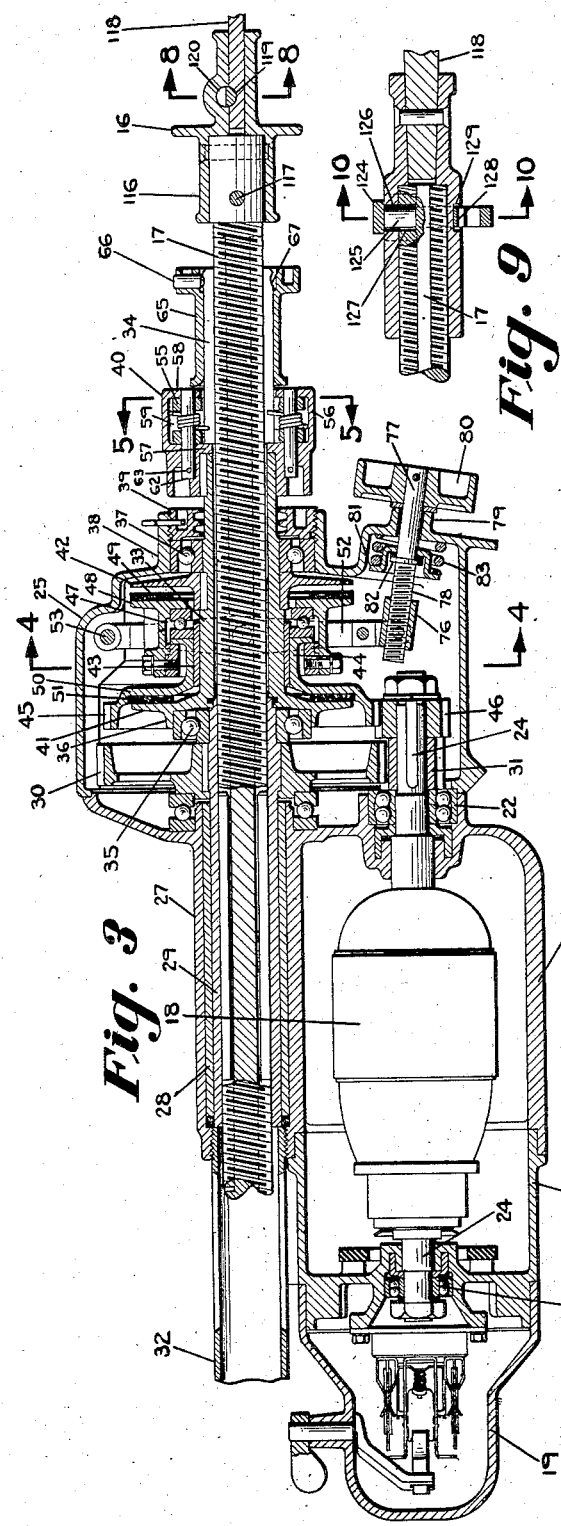

INVENTOR.
Robert K. Jeffrey.

Patented Feb. 11, 1936

2,030,636

UNITED STATES PATENT OFFICE 2,030,636

DRILL MECHANISM

Robert K. Jeffrey, Columbus, Ohio, assignor to The Jeffrey Manufacturing Company, Columbus, Ohio, a corporation of Ohio

REISSUED

Application September 24, 1930, Serial No. 484,190

19 Claims. (Cl. 255—47)

The invention relates to improvements in drills of the class wherein means are provided for projecting and retracting an auger, while the same is rotated, relative to the drill frame, such drills being commonly used where it is desired to bore in a vertical face, such as a coal face, to provide shot holes for the reception of the blasting charges.

According to the present invention means are provided to retract or withdraw the auger without reversing its direction of rotation. To this end the prime elements of the new mechanism are a rotating longitudinally displaceable screw shaft to which the auger is attachable, a feed nut rotatable in the same direction as the screw shaft, but at greater speed, so as to feed the shaft, clutch means to connect the nut with a rotary drive element, and means to arrest rotation of the nut to withdraw the shaft. The clutch is provided with a non-rotating shipper member which, when moved in one direction, engages the clutch elements, and, when moved in the opposite direction, comes into frictional contact with a braking surface associated with the nut so as to arrest rotation of the nut. Actuating means are provided for the shipper member for moving the latter to the desired position and retaining it in such position and the clutch loading movement is yieldingly effected.

In addition to the more general features just mentioned, the invention includes subsidiary features as will hereinafter appear.

An illustrative embodiment of the invention is shown in the accompanying drawings, in which:

Figure 1 is a side elevation of the complete drilling mechanism, with the floor engaging means shifted 90° out of normal position in order to show the detailed construction thereof.

Figure 2 is a plan view of the device shown in Figure 1.

Figure 3 is a longitudinal section taken along the line 3—3 of Figure 2.

Figure 7 is a vertical section of the lower end of the post showing one means of adjusting the height thereof.

Figure 8 is a section taken along the line 8—8 of Figure 3, and is illustrative of one form of auger mounting means.

Figure 9 is a sectional view of a modified form of auger mounting means.

Figure 11:
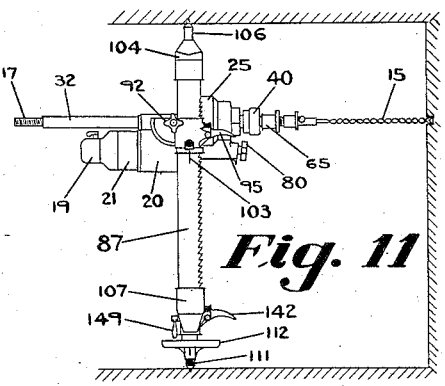
Figure 11 is a diagrammatic view of the drilling mechanism set up for operation.

Referring specifically to the drawings, in which like numbers indicate like parts, and particularly to Figure 11, there is provided a post 87 having a roof engaging member 106 and an adjustable floor engaging member 111. A drill supporting member 85 adapted to be slidably fixed to said post by means of a bearing member 86 carries the motor casing to which is attached, by bolts 26, the gear casing 25, which carries all of the gearing and clutch mechanism. The auger or drilling bit 15 is detachably held by a socket 16 fixed to the end of a feed screw 17, which is operatively connected to a motor 18 within a motor casing which comprises a frame 20 having bearings 22 at one end thereof and a commutator housing 21 having bearings 23 at the other end thereof, the housing having fixed thereto a switch housing 19, as shown in Figure 3. An armature shaft 24 is mounted in the bearings 22 and 23. The casings 19, 20, and 21, thus formed and joined, make a unit which is airtight in order to eliminate the danger of gas explosions, while the use of an electric motor is not essential, it is desirable.

Referring now more particularly to Figures 1, 2 and 3, a journal bearing 27 is cast integral with the top wall of the field frame 20 and is provided with an elongated bushing 28 within which is rotatably mounted a driving quill 29 by means of which the feed screw 17 is supported in the bearing 27. The said quill and feed screw are splined together and the latter derives driving power from the former. A gear 30 keyed to the quill 29 meshes with a pinion 31 which is fixed to the armature shaft 24 of the motor 18. Since the feed screw will extend rearwardly of the bearing 27, a pipe guard 32, screw threaded to said bearing, is provided to prevent injury to the operator.

A sleeve 33 is positioned immediately in advance of the quill 29, partially within the gear casing 25, and partially within a nut casing 46, the latter being disposed in front of the former and fixed to the sleeve. The sleeve 33 surrounds the feed screw 17 and its bore is slightly larger than the diameter of said feed screw; in order that it may be rotatably supported, ball bearings 35 are provided at one end thereof between the outside of the quill 29 and laterally extending annular flange 36, and at the other end thereof by ball bearings 37 fitted into the bore of a bearing 38 of the gear casing 25. A cap or gudgeon 39 closes the end of the bearing 38 and holds the bearings 37 in proper place. The sleeve 33 is the means for driving or holding a nut 34 depending on the direction of feed desired, which operation will be later described. A friction plate or flange 41 is cast integral with one end of the sleeve 33 and a second friction plate or flange 42 is keyed to the sleeve and longitudinally spaced from plate 41. Between said friction plates the sleeve 33 is provided with a bushing 43 upon which is rotatably and slidably mounted the hub 44 of a gear 45 which meshes with a pinion 46 fixed to the outer end of the armature shaft 24.

A shipper ring or collar 47 provided with a flange 48 having a clutch lining 49 fixed to its outer face encircles the elongated hub 44 of gear 45. The shipper ring is provided with thrust members positioned at either side of a radial flange formed at the free end of hub 44, there being a plain thrust ring at the left of the flange and a ball bearing assembly at the right thereof, Fig. 3.

Thus the gear 45 may be shifted to the left through the shipper member with a minimum of friction, elimination of friction in moving the gear to the right being inessential, as will appear. The gear 45 is provided with a plate center 50 to the outer face of which is fixed a clutch lining 51. A lever in the form of a yoke, 52 is pivoted at its upper end to the gear casing 25 on a pin 53, and is connected to the shifter collar 47 by pins or trunnions 54, being adapted to be swung longitudinally of the sleeve 33 in one direction in order to operatively connect the gear 45 to the said sleeve through plate 41 and thereby rotate the nut casing 40, or when shifted in the opposite direction to engage the clutch shifter collar 47 with flange 42 and thereby arrest rotation of sleeve 33 and nut casing 40, the collar being held against rotation by pins 54.

Figure 5:
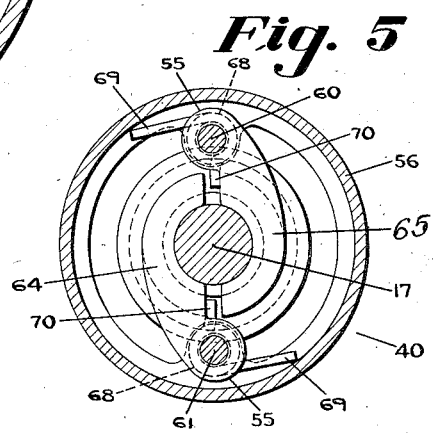
Figure 5 is a sectional view taken along the line 5—5 of Figure 3.

The nut 34, as shown in Figures 3 and 5, is made in two parts, each part being provided at one end thereof with a pair of ears 55 pierced by suitably aligned apertures. The nut casing 40 comprises a cylindrical outer wall 56 and is provided with inwardly extending flanges 57 and 58 which form a pocket 59. The said flanges are pierced by diametrically disposed aligned apertures adapted to receive pins 60 and 61 which are fixed to the nut casing 40 against longitudinal movement by shoulders 62 and cotter pins 63. The pins 60 and 61 extend through apertures in the ears 55 of each half of the nut. The ears 55 being positioned between flanges 57 and 58, longitudinal movement of the nut relative to the nut casing is prevented, and rotary movement of each half of the nut about the pins 60 and 61 is permitted. Encircling the two halves of the nut in order to hold them in engagement with the feed screw is a feed nut sleeve 65 which is provided at its outer end with a spring pressed detent 66 of usual construction, adapted to fit a groove 67 cut in the periphery of the nut. This arrangement prevents longitudinal movement of the sleeve relative to the nut except when it is desired to remove the sleeve in order that the nut may be disengaged from the feed screw. Springs 68 are wound around the pins 60 and 61 and the ends 69 abut against the outer wall of the pocket 59, while the ends 70 extend between the nut halves. The springs are so arranged that they exert an outwardly directed force against each part of the nut and the tendency is to move each half about its pivot to inoperative position to cause the disengagement from the feed screw.

Figure 4:
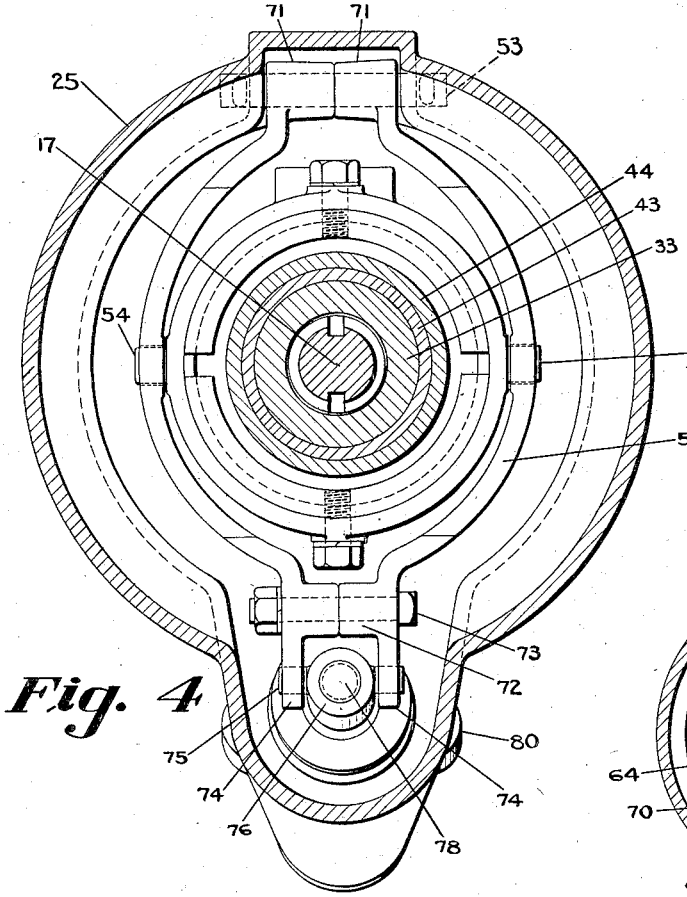
Figure 4 is a sectional view taken along the line 4—4 of Figure 3.

Referring more particularly now to Figures 3 and 4, the yoke 52 comprises two identical castings, each having a boss 71 at their uppermost portion for pivotal connection to the pin 53 and to maintain them in properly spaced relationship. Similar bosses 72 are provided at their lowermost portions and by means of a bolt 73 the two members are clamped together. Depending downwardly from the bosses 72 are lugs 74, each provided with an aperture in which is journaled a trunnion pin 75 of a nut 76. A screw threaded shaft 77 provided with a hand wheel 80 extends through a bearing 79 of the gear casing and into the nut 76. A spring cup 81 abuts a shoulder 82 of the shaft 77 and is held thereagainst by a spring 83 interposed between said cup and gear case, thereby preventing longitudinal non-rotative displacement of the shaft 77 relative to the gear case except under certain conditions later to be described.

Figure 6:
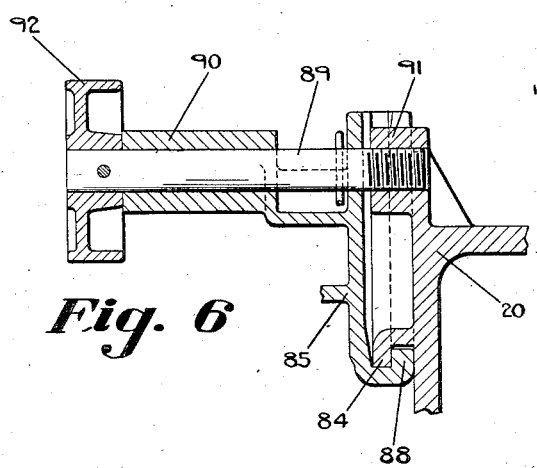
Figure 6 is a sectional view taken along the line 6—6 of Figure 2.

An arcuate flange 84, the periphery of which extends 180°, is cast integral with the motor casing 20. A drill supporting member 85 having a bearing 86 adapted to be fixed to the post 87 is also provided with an arcuate flange 88, the periphery of which extends through 180°. It will be noted in Figure 6 that the flanges 84 and 88, when in assembled relation, lock with each other, and thereby support the drill mechanism on the post.

In order that the parts may be held in fixed relation, there is provided a screw shaft 89, concentric with the arcuate flanges, extending through a bearing sleeve 90 of member 85 into a screw threaded aperture of a boss 91 formed on the motor casing 20. On the outer end of the shaft 89 is a hand wheel 92 which when rotated inwardly securely clamps the casting 85 to the motor casing, and when rotated outwardly until the shaft 89 is entirely clear of the boss 91, allows the parts to be disassembled.

The drill mechanism is adjustable on the post 87 without disassembling the parts. The bearing 86 which carries the flange 88 is provided with a pair of apertured lugs 93 through which extends a pin 94. A lever 95 having a pawl nose 96 is pivoted on the pin 94 and the nose 96 is engageable with the teeth 97 on said post. A spring 98 is interposed between the boss 99 of the bearing 86 and an offset 100 of the lever 95, and tends to keep the nose 96 engaged with the teeth 97. A boss 101 is provided on the bearing 86, and a clamping bolt 102 having a handle 103 prevents vertical movement of the bearing on the post.

In order that the entire post and drill will be in balanced relation, the floor and roof engaging means are offset as indicated with reference to the floor engaging means in Figure 1. The roof engaging means comprises an arm 104 clamped to the post by the bolt 105 and is provided with a pointed member 106. The floor engaging means is adjustable to different heights and comprises an arm 107 clamped to the post by a bolt 108 and provided with a bearing member 109 inside of which is slidably mounted a jack pipe 110. As shown in Figure 7, the bearing member 109 is provided with a pair of apertured lugs as at 140 through which extends the pin 141. A lever 142 having a pawl nose 143 is pivoted on the pin 141 and the nose 143 is engageable with teeth 144 on said jack pipe. A spring 145 is interposed between bearing member 109 and an offset 146 of lever 142, and tends to keep the nose 143 engaged with the teeth 144. A boss 147 is provided on the bearing 109 and a clamping bolt 148 having a handle 149 prevents vertical movement of the bearing on the post. Further adjusting mechanism is provided by the screw jack 111 mounted within the jack pipe 110 and having a hand wheel 112 which is held against the longitudinal movement away from the jack pipe by means of a spring-pressed pin 113 engaging a shoulder 114 turned on the jack pipe. The screw jack 111 is provided with a keyway extending throughout the length thereof and a key 115 formed in the bore of the jack pipe 110 prevents rotation of said screw jack when the hand wheel 112 is rotated. Therefore, by rotation of said hand wheel the screw jack will be moved longitudinally of the jack pipe to adjust the overall length of the post mounting.

One form of auger socket is shown in Figures 2, 3 and 8 and comprises a socket portion 116 adapted to fit over the end of the feed screw 17 and rigidly fixed thereto by rivets 117. The opposite end of the socket is provided with a pocket of polygonal cross section and is adapted to receive the tail piece 118 of the auger. When transporting the drill from one place to another or in changing augers, it is necessary to remove the auger from its connection with the feed screw. In order that this may be done the tail piece 118 of the auger is provided with a transversely extending groove 119 which when assembled with the socket is in partial register with a suitable aperture 120 in said socket, through which extends a pin 121, said pin being so positioned that it will hold the two parts in working relation. By rotation of the pin 121, a flat portion 122 will be brought into register with the said tail piece of the auger to permit removal of the auger.

Figure 10:
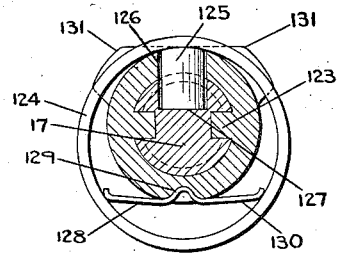
Figure 10 is a section taken on the line 10—10 of Figure 9.

A second form of auger socket is shown in Figures 9 and 10. The tail piece 118 of the auger is riveted in said socket which at its other end is provided with internal keys 123 cast integral therewith and engaged in key-ways of screw 17 to prevent rotation of the feed screw and socket. A ring 124 is positioned around the outer periphery of said socket and is provided with a pin 125 adapted to be inserted through an aperture 126 in the socket wall and into a radial recess 127 in the feed screw. The said ring is sufficiently large to permit removal of pin 125 from said recess so that the socket may be disengaged from the end of the feed screw. A spring 128 is seated in a notch 129 in the socket and has laterally extending arms 130 which engage the inner surface of the ring to hold the ring 124 in the position shown to prevent accidental disengagement of pin 125 from the recess 127, but allowing removal of said pin from said recess upon forced flexure of the spring. Lugs 131 are cast integral with the socket to prevent longitudinal movement of the ring 124 relative to the socket. The use of this form of socket permits removal of the feed screw from its association with the other parts. To accomplish this, the socket is removed from the end of the feed screw and the sleeve 65 is removed from the nut 34 whereby each half of said nut is rotated by its associated spring about its pivotal connection with the nut casing 40 to disengage the threads of the nut from the feed screw which may then be pulled out the rear end of the guard pipe 32.

The drill mechanism is thus removably attached to the post and vertically adjustable thereon. It may be adjusted about a horizontal pivot or the entire post and drill may be adjusted about the floor and roof engaging means in order to place the drill in position for the drilling of holes in various angles to the coal face.

When it is desired to take down or set up the parts of the drill in working relation, the post is inverted to place the floor engaging means at the top in such a position that the flange 88 is in line with the groove of the motor casing when the post is rotated about the center of the flange 88 so that said flange is engaged in a groove formed by the flange 84. When the post is in an upright position with the connection made as described, the parts are in assembled relation.

In operation, after the post is properly set up with relation to the coal face, the drill mechanism may be raised by lifting the drill mechanism and in so doing allowing the pawl nose 96 to slide over the teeth 97, and the drill mechanism may be lowered by lifting the lever 95 to disengage the pawl nose 96 from the teeth 97. The clamping screw 102 may be tightened to securely hold the drill in properly adjusted position on the post.

By means of the novel arrangement of parts, the feed screw rotates the auger at the desired cutting speed and it may be fed in either direction, forwardly at a relatively slow feeding speed and reversely at a relatively high withdrawal speed. It will be noted that when the gear 45 is shifted to the left by means of the shifter collar 47, referring to Figure 3, a contact is made between the plate center 50 on the gear and the flange 41, the spring 83 acts as an abutment and should the cutting become too hard for feeding at the usual feed of fifty inches per minute, the spring will be compressed which allows slipping of the clutch. When the shifter collar is moved in the opposite direction the clutch 48 will be engaged to prevent rotation of the nut, and since the feed screw is rotated clock-wise and the threads are left handed, the feed screw will be moved in a reverse direction. When this operation is performed the hand wheel 80 abuts the boss 79. A spring could be interposed between the boss 79 and the hand wheel 80, but it has been found unnecessary to satisfactory operation since the feed screw will not be overloaded when withdrawing the auger.

The plate 50 with its lining or face 51 constitutes one element of a friction clutch the other element of which is the friction plate 41. In a similar manner the plate 48 and lining or face 49 constitute one element of the other friction clutch, the other element of which is the friction plate 42. When the manually operable mechanism comprising the wheel 89 and the screw-threaded rod 78 holds the clutch elements 48, 49 and 50, 51 midway between the clutch elements 41 and 42 out of contact with both, the drill will be retained in neutral position so far as feed is concerned, although it may continue to rotate to cause the convolutions of the drill, as shown at 15 in Figure 11, to convey the cuttings rearwardly out of the previously drilled hole.

It will thus be seen that the threaded bar 17 may be continually rotated in the same direction and while being so rotated the drill may be fed forwardly, the forward feed may be stopped to finish the bottom of the drill hole and to remove some of the cuttings from the hole, and then fed backward to remove the drill from the hole while cleaning out remaining cuttings from the hole while the drill is rotating in the same direction as it rotated during the drilling operation.

The mining drill therefore includes a housing 25 in which is operatively arranged a threaded tool for longitudinal movement in one direction through the housing and for retractible movement in the opposite direction through the housing, and driving means connected through a train of gearing to the tool to impart rotative and reciprocal movements to the tool. Such train of gearing includes clutch means controlled by a manually movable member 52 movable into selective positions whereby the clutch means may be alternatively actuated to effect feeding movement of the tool when the member 52 is in its left-hand position as viewed in Fig. 3, to retain the tool neutral and rotative when the member 52 is in its central position, and to effect retraction of the tool when the member 52 is in its right-hand position.

When the motor 18 is operating, the drilling tool is being driven in a clockwise direction as viewed from its rear end. When the lever 52 is moved to the left as viewed in Fig. 3 the nut 34 will also be rotated in a clockwise direction but at a higher speed as determined by the gear ratios at 31, 30 and 46, 45, the pinion 46 being of greater diameter than the diameter of the pinion 31, and the diameter of the gear 45 being less than the diameter of the gear 30, as shown in Fig. 3. The differential between the clockwise rotation of the left-hand threads 17 and the clockwise rotation of the nut 34 will result in a slow forward feeding movement of the drilling tool.

When the lever 52 is in central or neutral position the nut 34 is free to rotate with the screw-threaded rod 17 and consequently the drill will continue to rotate in a clockwise direction without being fed or retracted. When the lever 52 is moved to its right-hand position the nut 34 will be held stationary by the engagement of the clutch elements 48, 49 and 42, the gear 50 being free to rotate relatively to the element 48 by reason of the ball thrust bearing shown in Fig. 3. When the nut 34 is thus held against rotation the clockwise rotation of the left-handed threads 17 will effect a relatively quick retraction of the drill from the hole while cleaning it of cuttings therein.

The ratio of reduction between pinion 31 and gear 30 is greater than that between pinion 46 and gear 45. In fact, the motor revolving at 3000 R. P. M. will rotate the gear 30 at 600 R. P. M. and the gear 45 at 800 R. P. M. Since the difference in R. P. M. is 200 and the left handed threads on the feed screw are four per inch, the auger will be fed into the coal at the rate of fifty inches per minute. The reverse feed will be three times as fast, or one hundred and fifty inches per minute. Experimentation in actual use has proven the above described drill mechanism to be exceedingly efficient, the new mechanisms overcoming many of the objectionable deficiencies in the electric drills in use heretofore.

The tool holder herein described has been covered in a divisional application Serial No. 599,965, filed March 19, 1932, now Patent No. 1,954,049 granted April 10, 1934. The feed nut is covered in a divisional application Serial No. 19,092, filed April 30, 1935.

It is understood that there are various forms and modifications of the drill mechanism shown in the present disclosure which are within the spirit and scope of the appended claims.

I claim:

1. In apparatus of the class described, a longitudinally displaceable screw shaft, means to rotate said shaft, a nut engaging the threads of said shaft, means to rotate the nut in the same direction as the shaft and at a speed greater than that of the shaft to cause longitudinal displacement of the latter in one direction, and brake means for arresting rotation of the nut during rotation of the shaft to cause displacement of the shaft in the other direction.

2. In apparatus of the class described, a longitudinally displaceable screw shaft, means to rotate said shaft, a nut engaging the threads of said shaft, means including a friction clutch to rotate the nut in the same direction as the shaft and at a speed greater than that of the shaft to cause longitudinal displacement of the latter in one direction, brake means for arresting the rotation of the nut during rotation of the shaft to cause displacement of the shaft in the other direction, and means to control said clutch, said last named means being operable to engage the clutch and hold it in engaged disposition.

3. In apparatus of the class described, a longitudinally displaceable screw shaft, means to rotate said shaft, a nut engaging the threads of said shaft, means including a friction clutch to rotate the nut in the same direction as the shaft and at a speed greater than that of the shaft to cause longitudinal displacement of the latter in one direction, brake means for arresting the rotation of the nut during rotation of the shaft to cause displacement of the shaft in the other direction, and means to control said clutch, said last named means being operable to engage the clutch and hold it yieldingly in engaged disposition.

4. In apparatus of the class described, a longitudinally displaceable screw shaft, means to rotate said shaft, a nut engaging the threads of said shaft, a gear mounted concentrically with said shaft and rotatable independently thereof, cooperating clutch elements between the gear and nut whereby the former is adapted to drive the latter, means for engaging said clutch elements, means to rotate the gear and thereby the nut in the same direction as the shaft and at a speed greater than that of the shaft to displace the latter longitudinally in one direction, and brake means for arresting rotation of the nut during rotation of the shaft to cause displacement of the shaft in the other direction.

5. In apparatus of the class described, a longitudinally displaceable screw shaft, means to rotate said shaft, a nut engaging the threads of said shaft, a rotatable sleeve freely surrounding the shaft and secured to the nut, a gear mounted concentrically with the shaft, a clutch comprising driving and driven elements in connection with the gear and sleeve respectively, means to rotate the gear in the same direction as the shaft and at a speed greater than that of the shaft, means operable to engage the clutch elements and hold them in engaged relation to cause rotation of the nut at the speed of the gear and thereby effect longitudinal displacement of the shaft in one direction, and brake means for arresting rotation of the nut when the clutch elements are disengaged whereby continued rotation of the shaft effects displacement of the shaft in the other direction.

6. In apparatus of the class described, a longitudinally displaceable screw shaft, means to rotate said shaft, a nut engaging the threads of said shaft, a rotatable sleeve freely surrounding the shaft and secured to the nut, a gear mounted concentrically with said sleeve, opposed friction surfaces on the gear and sleeve, means for axially displacing the gear to engage and disengage said surfaces, means to rotate the gear in the same direction as the shaft and at a speed greater than that of the shaft, the nut being rotated at the speed of the gear upon engagement of the friction surfaces to displace the shaft in one direction, and brake means for arresting rotation of the nut when the friction surfaces are disengaged whereby continued rotation of the shaft effects displacement of the shaft in the other direction.

7. In apparatus of the class described, a longitudinally displaceable screw shaft, means to rotate said shaft, a rotatable sleeve freely surrounding said shaft, a nut fixed to said sleeve and engaging the threads of said shaft, a pair of spaced radial flanges on said sleeve, a gear rotatably mounted on said sleeve between said flanges, a non-rotating shipper member mounted in connection with the gear to shift the latter axially, said gear having a friction surface adapted to engage one of the flanges to drive the sleeve and nut when the gear is shifted in one direction, said shipper member having a friction surface adapted to engage the other of said flanges when the gear is shifted in the other direction, and means to drive said gear in the same direction as the shaft and at a speed greater than that of the shaft.

8. In apparatus of the class described, a longitudinally displaceable screw shaft, means to rotate said shaft, a rotatable sleeve freely surrounding said shaft, a nut fixed to said sleeve and engaging the threads of said shaft, a pair of spaced radial flanges on said sleeve, a gear having an elongated hub rotatably mounted on said sleeve between said flanges, a non-rotating shipper ring in connection with said hub to shift the gear axially, said gear having a friction surface adapted to engage one of the flanges to drive the sleeve and nut when the gear is shifted in one direction, said shipper ring having a friction surface adapted to engage the other of said flanges when the gear is shifted in the other direction, and means to drive said gear in the same direction as the shaft and at a speed greater than that of the shaft.

9. In apparatus of the class described, a longitudinally displaceable screw shaft, means to rotate said shaft, a rotatable sleeve freely surrounding said shaft, a nut fixed to said sleeve and engaging the threads of said shaft, a pair of spaced radial flanges on said sleeve, a gear having an elongated hub rotatably mounted on said sleeve between said flanges, said hub having a radially projecting portion spaced from the gear, a non-rotating shipper ring having an internal circumferential groove in which the radially projecting portion of the hub is engaged, said gear having a friction surface adapted to engage one of the flanges to drive the sleeve and nut when the gear is shifted in one direction, said shipper ring having a friction surface adapted to engage the other of said flanges when the gear is shifted in the other direction, and means to drive said gear in the same direction as the shaft and at a speed greater than that of the shaft.

10. In apparatus of the class described, a longitudinally displaceable screw shaft, means to rotate said shaft, a rotatable sleeve freely surrounding said shaft, a nut fixed to said sleeve and engaging the threads of said shaft, a pair of spaced radial flanges on said sleeve, a gear having an elongated hub rotatably mounted on said sleeve between said flanges, said hub having a radially projecting portion spaced from the gear, a shipper ring having an internal circumferential groove in which the radially projecting portion of the hub is engaged, said gear having a friction surface adapted to engage one of the flanges to drive the sleeve and nut when the gear is shifted in one direction, said shipper ring having a friction surface adapted to engage the other of said flanges when the gear is shifted in the other direction, a shifting lever pivoted to said shipper ring and restraining the latter against rotation, and means to drive said gear in the same direction as the shaft and at a speed greater than that of the shaft.

11. In an apparatus of the class described, a longitudinally displaceable screw shaft, means to rotate said shaft, a rotatable sleeve freely surrounding said shaft, a nut fixed to said sleeve and engaging the threads of said shaft, a pair of spaced radial flanges on said sleeve, a gear having an elongated hub rotatably mounted on said sleeve between said flanges, said hub having a radially projecting portion spaced from the gear, a non-rotating shipper ring having an internal circumferential groove in which the radially projecting portion of the hub is engaged, said gear having a friction surface adapted to engage one of the flanges to drive the sleeve and nut when the gear is shifted in one direction, said shipper ring having a friction surface adapted to engage the other of said flanges when the gear is shifted in the other direction, a shifting lever pivoted to said shipper ring and restraining the latter against rotation, a self-locking screw and nut unit for swinging said lever, and means to drive said gear in the same direction as the shaft and at a speed greater than that of the shaft.

12. In apparatus of the class described, a longitudinally displaceable screw shaft, means to rotate said shaft, a nut on said shaft, a rotary element on said shaft, means to drive said rotary element in the same direction as the shaft and at a speed greater than that of the shaft, clutch means between said rotary element and said nut, and operating mechanism for said clutch means comprising a self-locking screw and nut unit.

13. In apparatus of the class described, a longitudinally displaceable screw shaft, means to rotate said shaft, a nut on said shaft, a rotary element on said shaft, means to drive said rotary element in the same direction as the shaft and at a speed greater than that of the shaft, clutch means between said rotary element and said nut, and operating mechanism for said clutch means comprising a self-locking screw and nut unit and a spring receiving the reaction of said unit.

14. In apparatus of the class described, a longitudinally displaceable screw shaft, means to rotate said shaft, a nut on said shaft, a sleeve freely rotatable on said shaft and fixed to said nut, a rotary element on said sleeve, a clutch comprising cooperating parts in connection with said nut and rotary element respectively, means to shift said rotary element to engage said parts, and means to drive the rotary element in the same direction as the shaft and at a speed greater than that of the shaft.

15. In apparatus of the class described, a longitudinally displaceable screw shaft, a gear splined on said shaft, a nut engaging the threads of said shaft, a sleeve freely rotatable on said shaft and fixed to said nut, a gear rotatable on said sleeve, a drive shaft, pinions on said drive shaft respectively engaging the gears to drive the same, cooperating clutch elements on said rotatable gear and sleeve, and means for axially displacing said revoluble gear to engage said clutch elements and drive the nut, the drive ratio to said nut being greater than that to said shaft.

16. In apparatus of the class described, a longitudinally displaceable screw shaft, a gear splined on said shaft, a nut engaging the threads of said shaft, a gear freely rotatable on the axis of said shaft, friction clutch means operable to connect the last named gear and nut, brake means operable to hold said nut against rotation upon disengagement of said friction clutch means, a power shaft, and pinions on said power shaft respectively engaging the gears to drive the same, the drive ratio to said nut being greater than that to said shaft.

17. In apparatus of the class described, drill mechanism and housing means therefor, said mechanism comprising a rotatable screw shaft extending through said housing and longitudinally displaceable relative thereto, a gear splined on said shaft, a nut engaging the threads of said shaft, a gear freely rotatable on the axis of said shaft, friction clutch means operable to connect said last named gear and nut, a motor casing in connection with said housing means, an electric motor in said casing with its armature shaft parallel to said screw shaft, and pinions on said armature shaft respectively engaging the gears to drive the same, the drive ratio to said nut being greater than that to said shaft.

18. In apparatus of the class described, drill mechanism and housing means therefor, said mechanism comprising a rotatable screw shaft extending through said housing and longitudinally displaceable relative thereto, a gear splined on said shaft, a nut engaging the threads of said shaft, a gear freely rotatable on the axis of said shaft, friction clutch means operable to connect said last named gear and nut, brake means operable to hold said nut against rotation upon disengagement of said friction clutch means, a motor casing in connection with said housing means, an electric motor in said casing with its armature shaft parallel to said screw shaft, and pinions on said armature shaft respectively engaging the gears to drive the same, the drive ratio to said nut being greater than that to said shaft.

19. In a mining drill, the combination of a housing, a threaded tool operatively arranged in said housing for longitudinal movement in one direction through the housing and for retractible movement in the opposite direction through said housing, a driving means, a train of gearing including clutch means adapted to be actuated by said driving means for imparting rotative and reciprocal movement to said tool, a controllable means for such clutch means, said controllable means including a manually movable member, movable into selective positions whereby the clutch may be alternatively actuated to impart reciprocal movement to said tool when such member is in one position, in another position to retain the tool neutral and rotative and in another position to impart to the tool reciprocal movement in the opposite direction.

ROBERT K. JEFFREY.